(12) United States Patent
Lange et al.

(10) Patent No.: US 6,971,676 B2
(45) Date of Patent: Dec. 6, 2005

(54) DEVICE FOR ABSORBING ENERGY FROM AN AUTOMOBILE VEHICLE STEERING COLUMN

(75) Inventors: Patrick Lange, La Baule (FR); Christophe Laporte, Villerable (FR); Guillaume Briere, vendome (FR)

(73) Assignee: Nacam France S.A., Vendome (FR)

(*) Notice: Subject to any disclaimer, the term of this patent is extended or adjusted under 35 U.S.C. 154(b) by 315 days.

(21) Appl. No.: 10/603,744

(22) Filed: Jun. 26, 2003

(65) Prior Publication Data
US 2004/0000781 A1    Jan. 1, 2004

(30) Foreign Application Priority Data
Jun. 27, 2002    (FR)    .................................. 02 08046

(51) Int. Cl.[7] .............................. B62D 1/18; B62D 1/19
(52) U.S. Cl. ........................ 280/777; 280/775; 74/493
(58) Field of Search .................. 74/492, 493; 280/777, 280/775

(56) References Cited

U.S. PATENT DOCUMENTS

| | | | |
|---|---|---|---|
| 5,520,416 A | * | 5/1996 | Singer, III et al. .......... 280/775 |
| 5,737,971 A | * | 4/1998 | Riefe et al. .................... 74/493 |
| 6,044,725 A | * | 4/2000 | Ganser .......................... 74/492 |
| 6,510,756 B2 | * | 1/2003 | Aota ............................. 74/492 |
| 2001/0017463 A1 | * | 8/2001 | Philippe et al. ............. 280/779 |

FOREIGN PATENT DOCUMENTS

| | | |
|---|---|---|
| EP | 0 849 141 A1 | 6/1998 |
| EP | 1 127 772 A1 | 8/2001 |
| WO | 4017995 A1 | 12/1990 |
| WO | WO 02/34607 A1 | 5/2002 |

* cited by examiner

*Primary Examiner*—Ruth Ilan
(74) *Attorney, Agent, or Firm*—Lawrence E. Laubscher, Sr.; Lawrence E. Laubscher, Jr.

(57) ABSTRACT

A steering column comprises a steering shaft rotatably mounted in a body-tube which is disposed on a lateral upright of a support assembly fixed to the structure of a vehicle by a connecting system. A bearing member is connected to the support assembly by the connecting system acting along the axis and to the body tube by an axial guidance system acting along the steering axis. In normal operation, the axial guidance system is sufficiently tightly clamped for there to be no axial sliding movement between the body-tube and the bearing member. In the event of an impact, there is axial sliding between the body-tube and the bearing member immobilized on the support assembly by the connection system acting along the axis.

12 Claims, 6 Drawing Sheets

DEVICE FOR ABSORBING ENERGY FROM AN AUTOMOBILE VEHICLE STEERING COLUMN

BACKGROUND OF THE INVENTION

1. Field of the Invention

The present invention relates to a device for absorbing energy from an automobile vehicle steering column. The device according to the invention applies to a steering column whose depth or whose inclination can be adjusted and to a steering column whose depth and inclination can both be adjusted. The device can also be applied to a steering column that is not adjustable. The steering column includes a steering shaft which is mounted in a body-tube and which carries a steering wheel; the body-tube is supported by the structure of the vehicle and immobilized in the required position relative to the structure of the vehicle, either when fitted in the manufacturing plant in the case of a fixed steering column or by the driver in the case of an adjustable steering column.

2. Description of the Prior Art

Known art devices for absorbing energy from a steering column generally include a support assembly comprising a fixed support member and a mobile support member. In normal operation, the mobile support member is fixed relative to the fixed support member, which is fastened to the structure of the vehicle. The energy absorbing device is adapted so that, in the event of an impact, the mobile support member slides relative to the fixed support member. The absorption of energy relies on members provided for this purpose, and the energy absorbed can be predicted relatively accurately. However, the absorption of energy has the disadvantage that it depends on the position to which the column has been adjusted.

In addition to the above absorption of energy there occurs an absorption of energy resulting from friction forces that arise when the mobile support member slides relative to the fixed support member. This latter absorption of energy is not known accurately and is difficult to predict, which leads to a relatively inaccurate energy absorbing device.

OBJECT OF THE INVENTION

The object of the present invention is to provide a device for absorbing energy from an automobile vehicle steering column that avoids the disadvantages described hereinabove. An energy absorbing device according to the invention must provide a steering column guide arrangement that absorbs additional energy that is negligible compared to the required energy absorption and/or is accurately adjustable.

Moreover, the energy absorbing device according to the invention must be easy to integrate into the envelope of existing steering columns.

SUMMARY OF THE INVENTION

According to an embodiment, the invention relates to a device for absorbing energy from an automobile vehicle steering column, which comprises a steering shaft rotatably mounted about a steering axis in a body-tube. The body-tube is connected to a support assembly fixed to the structure of the vehicle. The device of the invention includes mainly a bearing member which is connected to the support assembly by a lateral connection system relative to a vertical plane containing said steering axis, i.e. disposed on one side of this vertical plane, and an axial guidance system acting along the steering axis and comprising:

a sliding member that is disposed laterally relative to the vertical plane containing the steering axis and is attached to and arranged on the body-tube, balls that are disposed axially between the lateral sliding member of the body-tube and the bearing member, the bearing member being disposed laterally relative to the vertical plane containing said steering axis and being disposed between said body-tube and a lateral upright of the support assembly which is substantially parallel to the vertical plane containing the steering axis.

This arrangement is embodied so that:

in normal operation there is no axial sliding movement between the body-tube and the bearing member;

and in that, in the event of an impact, there is axial sliding between the body-tube carrying the steering wheel and the bearing member retained in position relative to the support assembly by the connecting system, with a quantity of energy that is negligible compared to the total absorption of energy and/or is accurately adjustable.

In this architecture of the axial guidance system:

the lateral sliding member is substantially parallel to the vertical plane containing the steering axis and has a central portion that is extended vertically at each of its two ends by an internal raceway, each of the two internal raceways having a direction substantially parallel to the steering axis, the two internal raceways being situated one on each side of a clamping plane passing through the steering axis and perpendicular to the vertical plane containing the steering axis;

the bearing member has a substantially vertical central portion that is pressed against the lateral upright of the support assembly and is extended vertically at each of its two ends by an external raceway, each of the two external raceways having a direction substantially parallel to the steering axis, the two external raceways being situated one on each side of the clamping plane containing the steering axis;

the balls are arranged in two sets that are respectively disposed between the internal raceway and the corresponding external raceway, each of the two sets having its balls retained relative to each other by a cage.

To be more precise, according to the invention, each of internal raceways and external raceways comprises two planes inclined relative to each other and parallel to the steering axis; the rear end at the steering wheel end of each of the two external raceways has a stepped portion which folds against the end of the cage of the corresponding balls.

Furthermore, according to the invention, an energy absorbing member can be disposed between the bearing member and the body-tube which, in the event of an impact, slides in the bearing member, which remains fixed; the energy absorbing member being fixed relative to the bearing member and relative to the body-tube in normal operation, said absorption of energy is independent of the position to which the body-tube is adjusted. The energy absorbing member can be a metal band whose section is adjusted as a function of the energy to be absorbed and which is mounted parallel to the central portion of the bearing member, whose front end is fastened to the central portion, and whose rear end at the steering wheel end is engaged in, and in the event of an impact deformed against, the front end of the body-tube.

In one embodiment, the rear end at the steering wheel end is connected to the body-tube and is deformed relative to said body-tube.

In the case of a fixed steering column:

the bearing member has two portions inclined relative to each other and substantially parallel to the steering axis, each inclined portion being disposed between the corresponding external raceway and the central portion;

said central portion includes a hole through which passes a clamping rod of the connecting system;

the lateral upright comprises two inclined retaining portions, which are disposed one on each side of the clamping plane and arranged so that the corresponding inclined portion of the bearing member is pressed against said inclined retaining portion when the connecting system is immobilized;

the lateral upright has a hole in it through which the clamping rod passes.

In the case of a steering column adjustable in height and/or in depth, the connecting system between the bearing member and the support assembly is a clamping system along a clamping axis, which is substantially perpendicular to the vertical plane containing the steering axis. Said clamping system includes a clamping rod whose axis is the clamping axis, and all the other members of the clamping system are mounted on said clamping rod which passes through the bearing member, the lateral upright and all the other clamping members; the clamping rod having a head that is pressed against the internal face of the central portion of the bearing member and a threaded external end on which a clamping nut is mounted.

In this latter case of an adjustable steering column:

the bearing member has two portions inclined relative to each other and substantially parallel to the steering axis, each inclined portion being disposed between the corresponding external raceway and the central portion;

said central portion includes an oblong hole through which passes the clamping rod which is parallel to the steering axis;

a retaining member is disposed between the bearing member and the internal face of the lateral upright, said retaining member having two inclined retaining portions, which are disposed one on each side of the clamping plane, and which are arranged so that the corresponding inclined portion of the bearing member is pressed against said inclined retaining portion when the clamping system is locked;

said retaining member has a hole in it through which the clamping rod passes;

the lateral upright has an oblong hole in it through which the clamping rod passes and which is perpendicular to the clamping plane.

The device in accordance with the invention for absorbing energy from a steering column therefore has the advantage of providing a column guidance arrangement which, in the event of an impact, absorbs additional energy that is negligible compared to the required energy absorption and/or is accurately adjustable. In the event of an impact to the vehicle, the force is transmitted via the steering wheel and the steering shaft to the body-tube. Because of this force, the body-tube slides, causing the balls to rotate. A device in accordance with the invention therefore provides good control over the forces caused by the impact and eliminates the effects of friction. It separates the depth adjustment function of the steering column from the energy absorption function.

BRIEF DESCRIPTION OF THE DRAWINGS

Further features and advantages of the invention will be apparent more clearly from the following particular description of several preferred embodiments of the invention shown in the corresponding accompanying drawings, in which.

DESCRIPTION OF THE PREFERRED EMBODIMENTS

Figure 1:
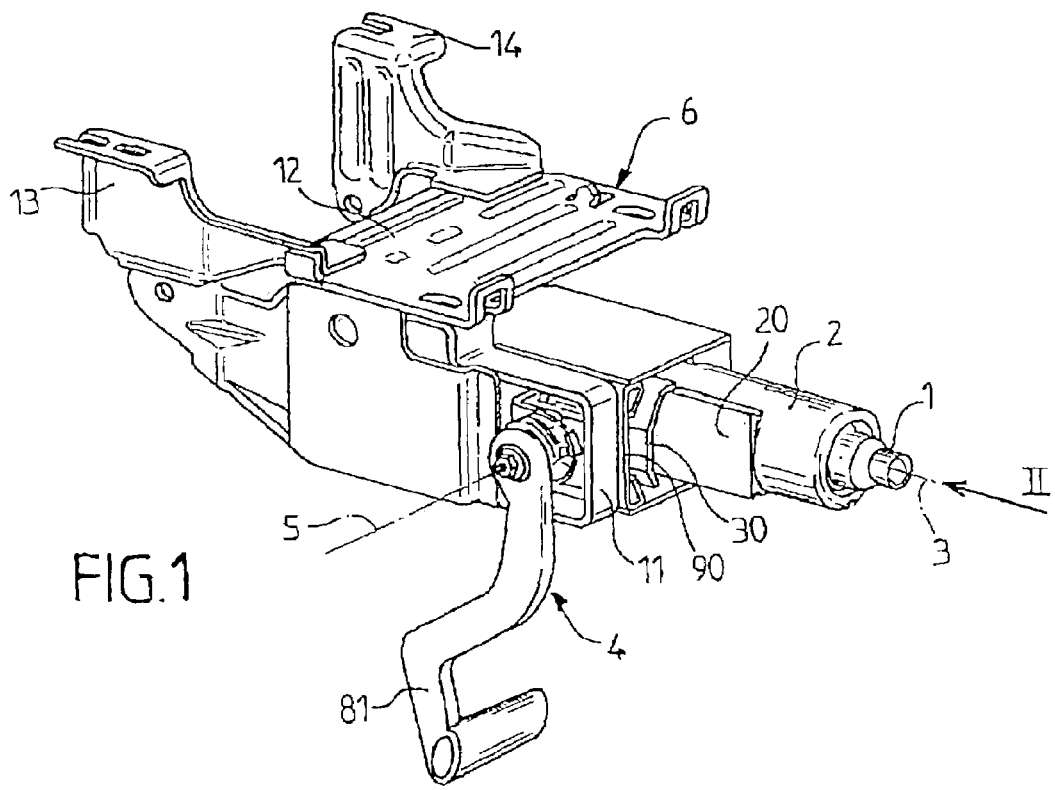
FIG. 1 is a perspective view of a device in accordance with the invention for absorbing energy from a steering column.
Figure 2:
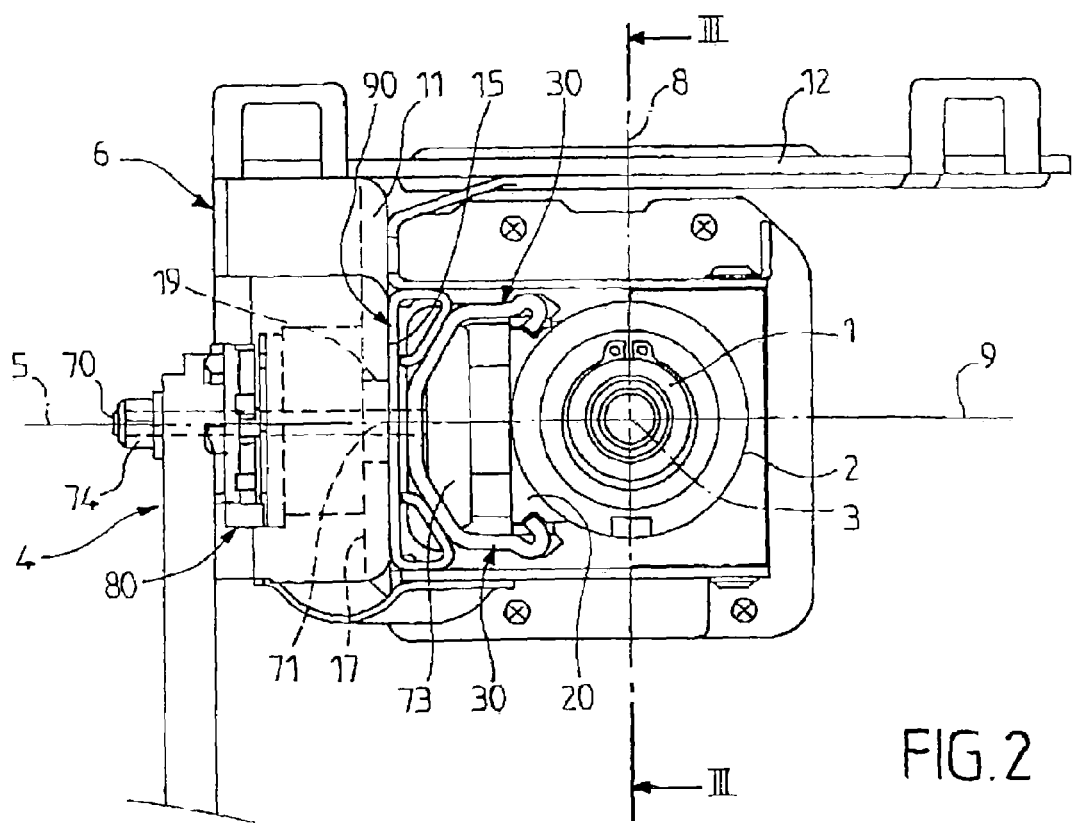
FIG. 2 is a view in the direction II in FIG. 1.
Figure 3:
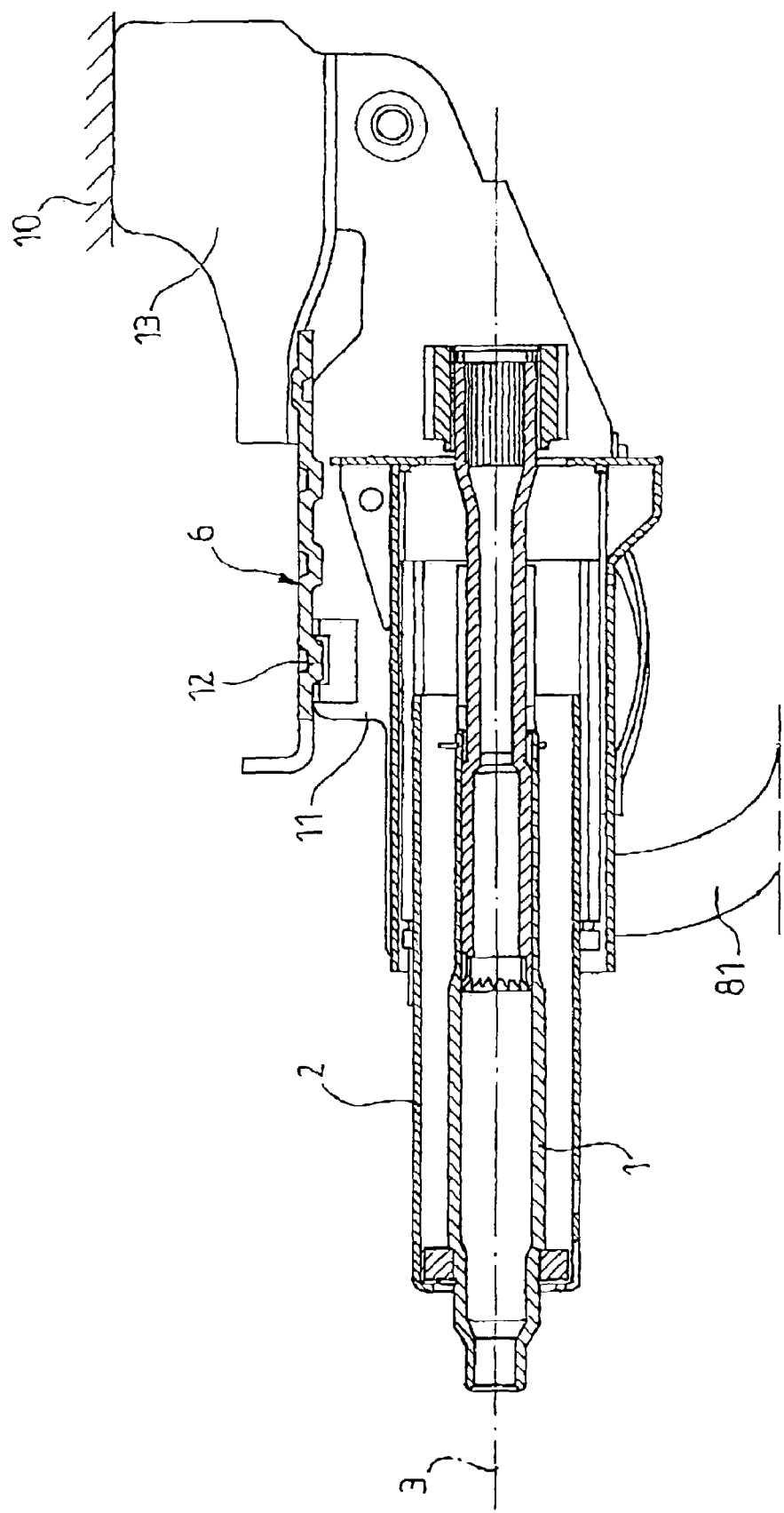
FIG. 3 is a view in section taken along the line III—III in FIG. 2.
Figure 4:
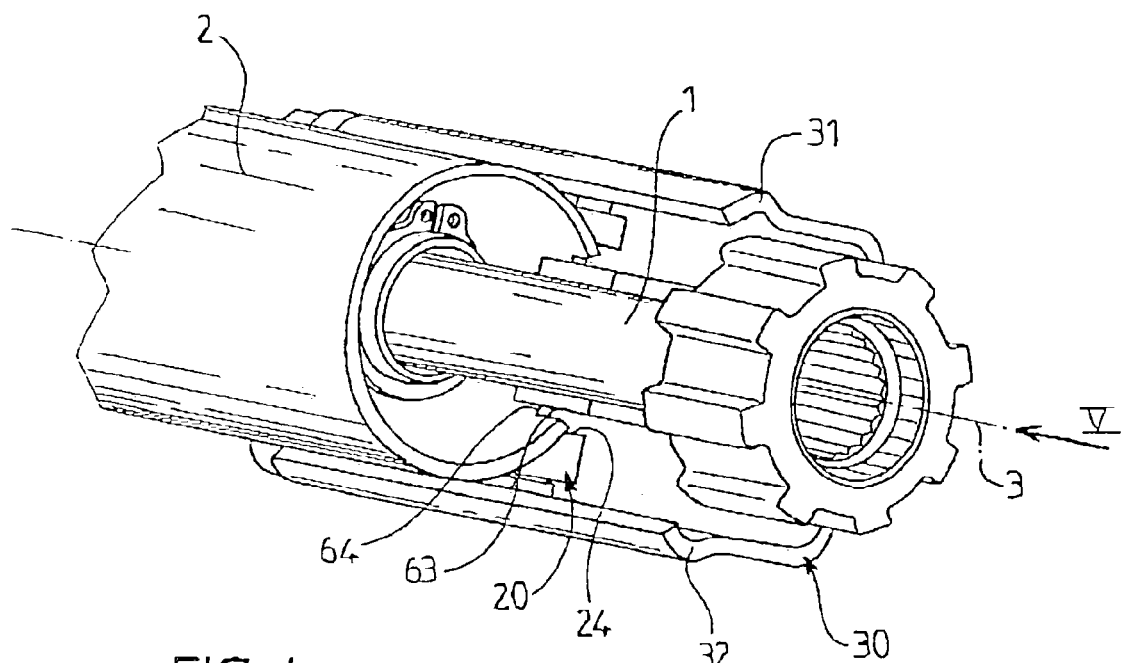
FIG. 4 is a partial front perspective view of the body-tube and the bearing member.
Figure 6:
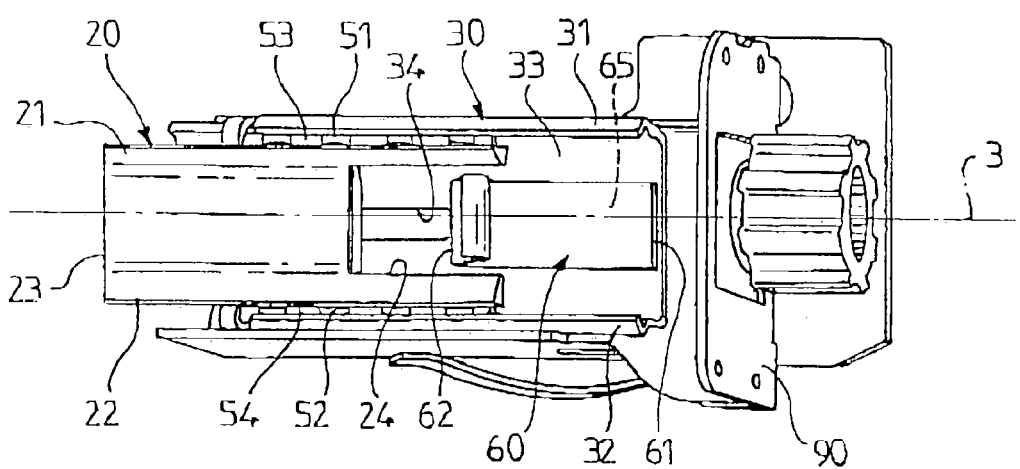
FIG. 6 is a perspective view of the lateral sliding member, the bearing member, and the lateral upright of the support assembly.
Figure 5:
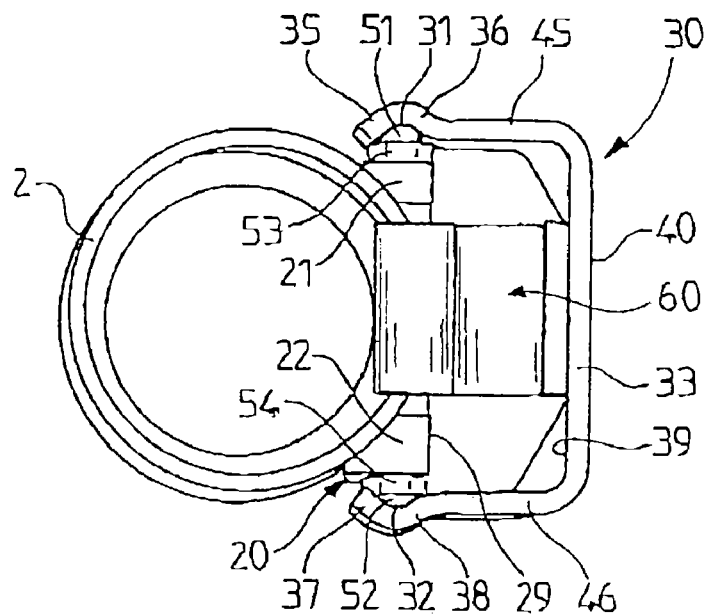
FIG. 5 is a transverse view of the front end of the bearing member in the direction V in FIG. 4.
Figure 9:
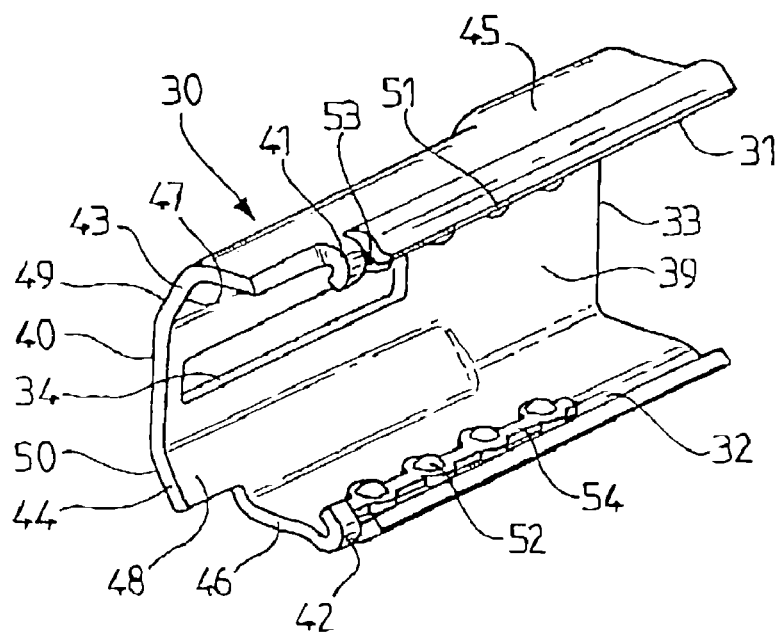
FIG. 9 is a rear perspective view of the bearing member and the two sets of balls.
Figure 7:
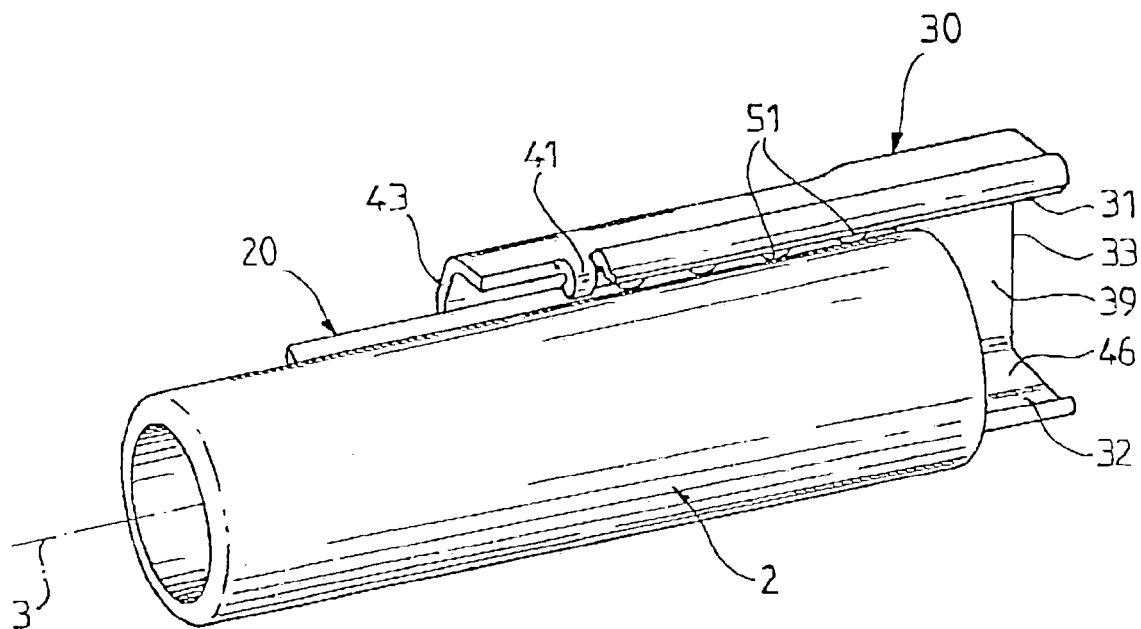
FIG. 7 is a rear perspective view of the body-tube and the bearing member.
Figure 8:
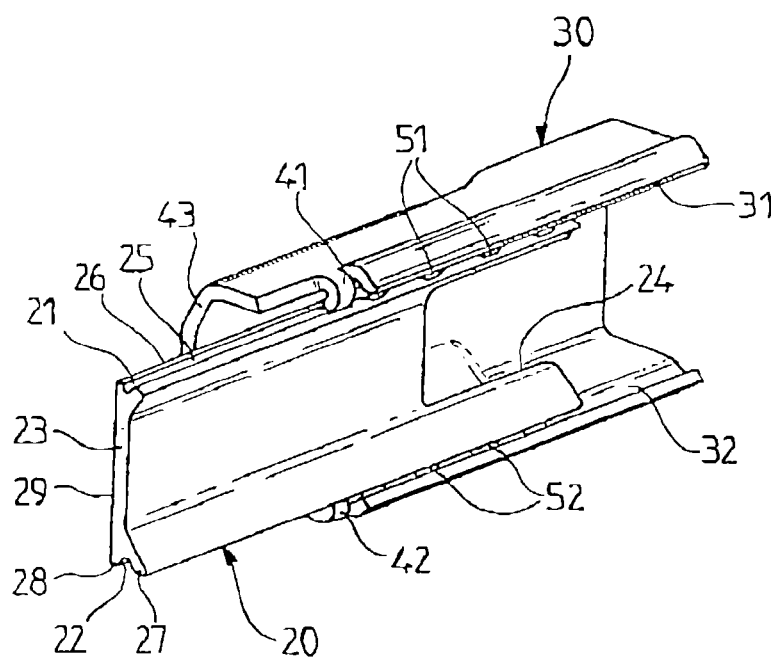
FIG. 8 is a rear perspective view of the lateral sliding member and the bearing member.

As shown in FIGS. 1 to 3, the invention relates to a device for absorbing energy from an automobile vehicle steering column. The steering column comprises a steering shaft 1 which is rotatably mounted about the steering axis 3. The steering shaft 1 is rotatably mounted in a body-tube 2. The body-tube 2 is connected to a support assembly 6 which is fixed to the structure 10 of the vehicle. The support assembly 6 includes a lateral member 13 and a lateral member 14 which are arranged on respective opposite sides of a vertical plane 8 passing through the steering axis 3. The lateral member 13 and the lateral member 14 are fixed to the structure 10 of the vehicle and are fastened to a connecting member 12 substantially perpendicular to the vertical plane 8.

The connecting member 12 carries a lateral upright 11 that is wholly on one side of the vertical plane 8 and that is substantially vertical, e.g. substantially parallel to the vertical plane 8 passing through the steering axis 3.

The inclination or the depth of the steering column or the inclination and the depth of the steering column can be adjusted.

The body-tube 2 is connected to the support assembly 6 by a height or depth position adjustment system or a height and depth position adjustment system.

The steering column includes a clamping system 4 that provides a locked position and an unlocked position of the steering column.

The clamping system 4 is disposed on and acts along a clamping axis 5 which is substantially perpendicular to the vertical plane 8 passing through the steering axis 3.

In the remainder of the description, and in respect of the same component, the term "internal" or "interior" in relation to the steering axis 3 or relative to the vertical plane 8 means closer to the steering axis 3 or the vertical plane 8, while the term "external" or "exterior" means farther away from the steering axis 3 or the vertical plane 8.

Thus the lateral upright 11 has an internal face 15 and an external face 17 relative to the steering axis 3 or relative to the vertical plane 8. The internal face 15 and the external face 17 are substantially parallel to the vertical plane 8.

Moreover, the upright 11 has an oblong hole 19 that is oriented in the direction of the heightwise adjustment of the position adjustment system.

The position adjustment system is locked in a chosen position by the clamping system 4. The clamping axis 5 is substantially perpendicular to the lateral upright 11 of the support assembly 6. The clamping device has two positions, namely an unlocked position in which the clamping device is unlocked to enable the required adjustment of the steering column and a locked position in which the clamping device is locked to guarantee that the chosen position is maintained.

In the embodiment of the invention shown in the various figures, the clamping axis 5 passes through the body-tube 2 in the vicinity of the steering axis 3. The plane containing the clamping axis 5 and the steering axis 3 is referred to as the clamping plane 9; the clamping plane 9 is substantially perpendicular to the vertical plane 8.

Figure 10:
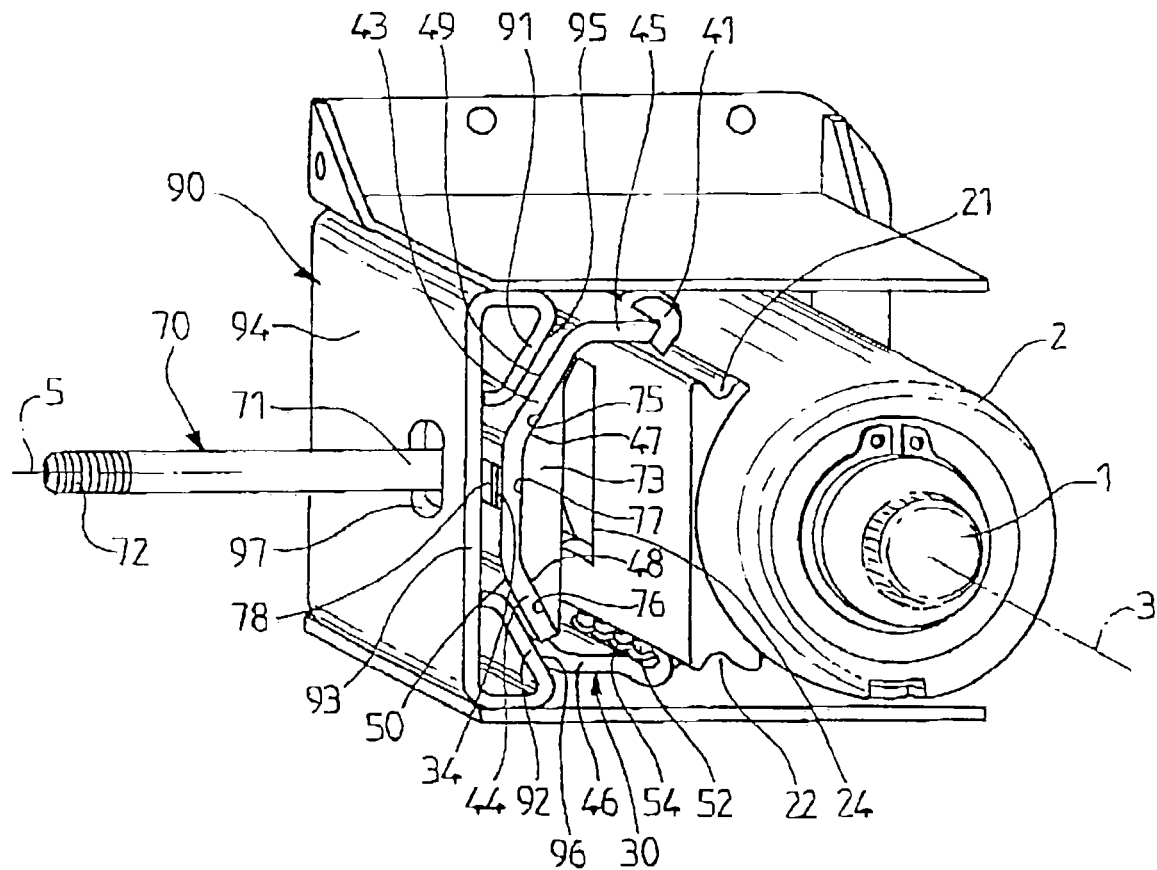
FIG. 10 is a perspective view corresponding to FIG. 2.

Referring more specifically to FIGS. 2 and 10, the energy absorbing device according to the invention includes a bearing member 30 and an axial guidance system.

The bearing member 30 is connected to the support assembly 6 by a connecting system which is laterally disposed relative to the vertical plane 8 of the steering axis. In other words, said connection system is wholly on one side of the vertical plane 8, and connects the bearing member 30 to the lateral upright 11 of the support assembly 6.

The axial guidance system acts along the steering axis 3 and is arranged between the body-tube 2 and the bearing member 30.

The axial guidance system operates in the following:
  in that in normal operation the axial guidance system is arranged so that there is no axial sliding movement between said body-tube and said bearing member;
  and in that, in the event of an impact, there is axial sliding between the body-tube 2 carrying the steering wheel and the bearing member 30 retained in position relative to the support assembly 6 by the connecting system.

The axial guidance system comprises a lateral sliding member 20 and the bearing member 30; in the event of an impact, the lateral sliding member 20 moves in the bearing member 30 along the steering axis 3.

The lateral sliding member 20 is wholly on one side of the vertical plane 8 of the steering axis 3. The lateral sliding member 20 is attached to and arranged on the body-tube 2. The bearing member 30 is disposed laterally relative to said vertical plane 8 of the steering axis 3. The bearing member 30 is disposed between the body-tube 2 and a lateral upright of the support assembly, which is substantially parallel to the vertical plane 8 of the steering axis 3.

The axial guidance system comprises balls 51, 52 that are axially disposed between the body-tube 2 and the bearing member 30 so that, in the event of an impact, the axial sliding necessitates a quantity of energy that is negligible compared to the total absorption of energy and/or accurately adjustable.

The lateral sliding member 20 is substantially parallel to the vertical plane 8 containing the steering axis 3. Said lateral sliding member has a central portion 23 that is extended vertically at each of its two ends by an internal raceway 21, 22. Each of the two internal raceways 21 and 22 has a direction substantially parallel to the steering axis 3. The two internal raceways 21 and 22 are situated one on each side of a clamping plane 9 passing through the steering axis 3 and perpendicular to the vertical plane 8 of the steering axis 3.

The bearing member 30 has a substantially vertical central portion 33 that is pressed against the lateral upright 11 of the support assembly 6. Said bearing member is extended vertically at each of its two ends by an external raceway 31, 32. Each of the two external raceways 31 and 32 has a direction substantially parallel to the steering axis 3. The two external raceways 31 and 32 are situated one on each side of the clamping plane 9 of the steering axis 3.

The balls 51 and 52 are arranged in two sets that are respectively disposed between the corresponding internal raceway 21, 22 and the corresponding external raceway 31, 32. Each of said two sets has its balls 51, 52 which are retained relative to each other by a corresponding cage 53, 54.

Each raceway comprises two planes inclined to each other and parallel to the steering axis 3. The internal raceway 21 comprises two inclined planes 25 and 26 and the corresponding external raceway 31 comprises two inclined planes 35 and 36. The internal raceway 22 comprises two inclined planes 27 and 28 and the corresponding external raceway 32 comprises two inclined planes 37 and 38.

The rear end at the steering column end of each of the two external raceways 31 and 32 has a corresponding stepped portion 41, 42 which folds against the end of the corresponding cage 53, 54 of the corresponding balls 51, 52.

The energy absorbing energy device comprises an energy absorbing member 60, 100 that is disposed between the bearing member 30 and the body-tube 2. In the event of an impact, said body-tube 2 slides in the bearing member 30 which remains fixed. The energy absorbing member 60, 100 is fixed relative to the bearing member 30 and relative to the body-tube 2 in normal operation. The absorption of energy is independent of the position to which the body-tube 2 is adjusted.

The energy absorbing member 60 is a metal band whose section is adjusted as a function of the energy to be absorbed and which is mounted parallel to the central portion 33 of the bearing member 30. Said energy absorbing member 60 has a front end 61 and a rear end 62 at the steering wheel end. The front end 61 is engaged in an opening 65 in the central portion 33. The rear end 62 is engaged in, and in the event of an impact is deformed against, the bottom 64 of a notch 63 at the front end of the body-tube 2. The central portion 23 of the lateral sliding member 20 has a notch 24 at its front end in which the energy absorbing member 60 engages and through which the energy absorbing member 60 passes in the event of an impact.

In a different embodiment, the rear end of the metal band is connected to the body-tube 2 and is deformed relative to the body-tube 2.

The connecting system between the bearing member 30 and the support assembly 6 is the clamping system 4 acting along a clamping axis 5 which is substantially perpendicular to the vertical plane 8 of the steering axis 3.

The clamping system 4 includes a clamping rod 70 whose axis is the clamping axis 5. All the other members of the clamping system 4 are mounted on said clamping rod 70. The clamping rod 70 passes through the bearing member 30, the lateral upright 11 and all the other clamping members. The clamping rod 70 has a head 73 that is pressed against the internal face 39 of the central portion 33 of the bearing member 30. The clamping rod 70 has a threaded external end 72 on which a clamping nut 74 is mounted.

The bearing member 30 has two portions 43, 44 which are inclined relative to each other and substantially parallel to the steering axis 3. Each inclined portion 43, 44 is disposed between the corresponding external raceway 31, 32 and the central portion 33. The central portion 33 includes an oblong hole 34 through which passes the clamping rod 70 which is parallel to said steering axis 3.

A retaining member 90 is disposed between said bearing member 30 and the internal face 15 of said lateral upright 11. The retaining member 90 has two inclined retaining portions 91, 92 which are disposed one on each side of the clamping plane 9. The inclined retaining portions 91 and 92 are arranged so that the corresponding inclined portion 43, 44 of the bearing member 30 is pressed against the inclined retaining portion 91, 92 when said clamping system 4 is locked.

The retaining member 90 has a hole 97 in it through which the clamping rod 70 passes. The lateral upright 11 has an oblong hole 19 in it through which the clamping rod 70 passes and which is perpendicular to said clamping plane 9.

Furthermore, the clamping rod 70 carries a sliding member 78 in the oblong hole 34 in the bearing member 30. The sliding member 78 is coated with a plastics material having a low coefficient of friction.

The energy absorbing device can also be applied to a steering column that is not adjustable in position. In this case, the fixing of the bearing member 30 to the lateral upright 11 includes the clamping rod 70.

The bearing member 30 has two portions 43 and 44 which are inclined to each other and substantially parallel to the steering axis 3. Each inclined portion 43, 44 is disposed between the corresponding external raceway 31, 32 and the central portion 33. The central portion 33 has a hole 34 in it through which passes the clamping rod 70 of the connection system.

The lateral upright 11 has two inclined retaining portions 91 and 92 which are disposed one on each side of the clamping plane 9. The inclined retaining portions 91 and 92 are arranged so that the corresponding inclined portion 43, 44 of the bearing member 30 is pressed against the inclined retaining portion 91, 92 when the connection system is locked.

The lateral upright 11 includes a hole 19 through which the clamping rod 70 passes.

Figure 11:
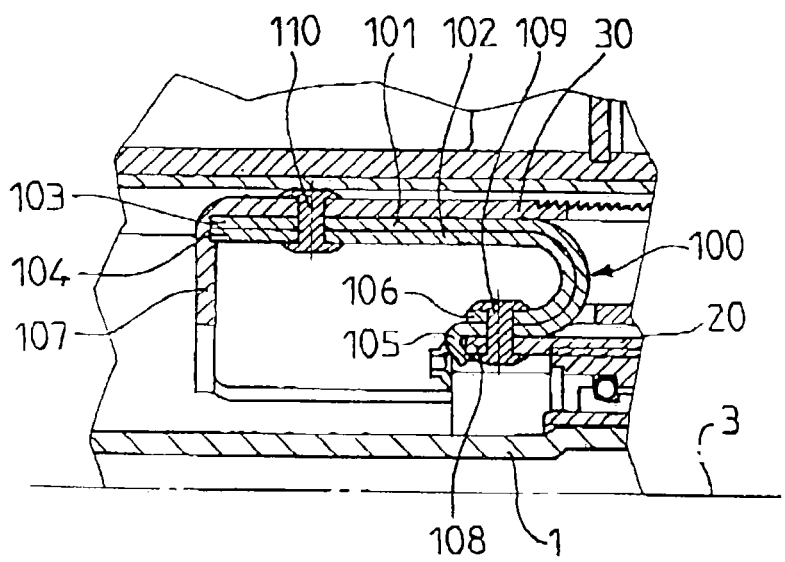
FIG. 11 is a view of a different embodiment in axial section in the clamping plane.

FIG. 11 shows a variant of embodiment in which the rear end of the metal band constitutes the energy absorbing member, is connected to the body-tube 2, and is deformed relative to the body-tube 2.

An energy absorbing member 100 is disposed between the bearing member 30 and the lateral sliding member 20 belonging to the body-tube 2. The energy absorbing member has an internal portion 101 and an external portion 102 which take the form of overlapping metal bands. The two metal bands have a section that is adjusted as a function of the energy to be absorbed and are mounted parallel to the central portion 33 of the bearing member.

The front end of the bearing member 30 has a front rim 107 serving as an abutment member substantially perpendicular to the steering axis 3.

The front end 103 of the internal portion 101 and the front end 104 of the external portion 102 are pressed against the front rim 107. The rear end 105 of the internal portion 101 is curved against the front end 108 of the lateral sliding member 20. The rear end 106 of the external portion 102 covers the uncurved end of the internal portion 101. An assembling member 109 such as a rivet fixes the internal portion 101 and the external portion 102 to the lateral sliding member 20.

An assembling member 110 such-as a rivet fixes the internal portion 101 and the external portion 102 to the bearing member 30.

What we claim is:

1. A device for absorbing energy from an automobile vehicle steering column, said column comprising a steering shaft rotatably mounted about a steering axis in a body-tube carrying a steering wheel, said body-tube being connected to a support assembly fixed to a structure of said vehicle, said energy absorbing device including:
    a bearing member which is connected to said support assembly by a lateral connection system relative to a vertical plane containing said steering axis;
    an axial guidance system acting along said steering axis and comprising:
        a lateral sliding member that is disposed laterally relative to said vertical plane (8) containing said steering axis and is attached to and arranged on said body-tube, and
        balls that are disposed axially between the lateral sliding member of said body-tube and said bearing member,
        said bearing member being disposed laterally relative to said vertical plane containing said steering axis and being disposed between said body-tube and a lateral upright of said support assembly, said lateral upright being substantially parallel to said vertical plane containing said steering axis;
    in normal operation there is no axial sliding movement between said body-tube and said bearing member; and
    in the event of an impact, there is axial sliding between said body-tube and said bearing member retained in position relative to said support assembly by said connecting system.

2. The energy absorbing device claimed in claim 1, wherein, for said axial guidance system:
    said lateral sliding member is substantially parallel to said vertical plane containing said steering axis and has a central portion that has two ends extended vertically by two internal raceways respectively, each of said two internal raceways having a direction substantially parallel to said steering axis, said two internal raceways being situated one on each side of a clamping plane passing through said steering axis and perpendicular to said vertical plane containing said steering axis;
    said bearing member has a substantially vertical central portion that is pressed against said lateral upright of said support assembly and that has two ends extended vertically by two external raceways respectively, each of said two external raceways having a direction substantially parallel to said steering axis, said two external raceways being situated one on each side of said clamping plane containing said steering axis; and
    said balls are arranged in two sets that are respectively disposed between the respective internal raceway and the respective external raceway, each of said two ball sets having balls which are retained relative to each other by a respective cage.

3. The energy absorbing device claimed in claim 2, wherein each of said two internal raceways and said two external raceways comprises two planes and relative to each other and parallel to said steering axis, the rear end at the steering wheel end of each of said two external raceways having a stepped portion which folds against an end of said cage of the respective balls.

4. The energy absorbing device claimed in claim 2, including an energy absorbing member that is disposed between said bearing member and said body-tube, said body-tube, in the event of an impact, sliding in said bearing member which remains fixed, said energy absorbing member being fixed relative to said bearing member and relative to said body-tube in normal operation, said absorption of energy being independent of the position to which said body-tube is adjusted.

5. The energy absorbing device claimed in claim 4, wherein said energy absorbing member is a metal band whose section is adjusted as a function of the energy to be absorbed and which is mounted parallel to said central portion of said bearing member, whose front end is fastened to said central portion and whose rear end at the steering wheel end is engaged in, and in the event of an impact deformed against, a front end of said body-tube.

6. The energy absorbing device claimed in claim 4, wherein said energy absorbing member is a metal band whose section is adjusted as a function of the energy to be absorbed and which is mounted parallel to said central portion of said bearing member, whose front end is fastened to said central portion, and whose rear end at the steering wheel end is connected to said body-tube and is deformed relative to said body-tube.

7. The energy absorbing device claimed in claim 2, wherein:
said bearing member has two portions inclined relative to each other and substantially parallel to said steering axis, each inclined portion being disposed between the respective external raceway and said central portion;
said central portion includes a hole through which passes a clamping rod of said connecting system;
said lateral upright comprises two inclined retaining portions which are disposed one on each side of said clamping plane and which are arranged so that the corresponding inclined portion of said bearing member is pressed against said inclined retaining portion when said connecting system is immobilized; and
said lateral upright has a hole in it through which said clamping rod passes.

8. The energy absorbing device claimed in claim 2, wherein said steering column is adjustable in height and/or in depth.

9. The energy absorbing device claimed in claim 8, wherein said connecting system between said bearing member and said support assembly is a clamping system along a clamping axis which is substantially perpendicular to said vertical plane containing said steering axis.

10. The energy absorbing device claimed in claim 9, wherein said clamping system includes a clamping rod whose axis is said clamping axis and clamping members mounted on said clamping rod, said clamping rod passing through said bearing member, said lateral upright and said clamping members, said clamping rod having a head that is pressed against an internal face of said central portion of said bearing member and a threaded external end on which a clamping nut is mounted.

11. The energy absorbing device claimed in claim 10, wherein:
said bearing member has two portions inclined relative to each other and substantially parallel to said steering axis, each inclined portion being disposed between the respective external raceway and said central portion;
said central portion includes an oblong hole through which passes said clamping rod which is parallel to said steering axis;
a retaining member is disposed between said bearing member and the internal face of said lateral upright, said retaining member having two inclined retaining portions which are disposed one on each side of said clamping plane and are arranged so that the corresponding inclined portion of said bearing member is pressed against said inclined retaining portion when said clamping system is locked;
said retaining member has a hole in it through which said clamping rod passes; and
said lateral upright has an oblong hole in it through which said clamping rod passes and which is perpendicular to said clamping plane.

12. The energy absorbing device claimed in claim 11, wherein said clamping rod carries a sliding member coated with a plastics material having a low coefficient of friction in said oblong hole in said bearing member.

\* \* \* \* \*